United States Patent [19]

Adomeit et al.

[11] Patent Number: 5,421,632
[45] Date of Patent: Jun. 6, 1995

[54] MULTIPLE VISOR SYSTEM WITH CONCENTRIC PIVOT AXES

[75] Inventors: Mark E. Adomeit, Holland; Edward T. Boerema, West Olive, both of Mich.

[73] Assignee: Prince Corporation, Holland, Mich.

[21] Appl. No.: 136,416

[22] Filed: Oct. 13, 1993

[51] Int. Cl.[6] .................................. B60J 3/02
[52] U.S. Cl. ...................... 296/97.9; 296/97.12
[58] Field of Search .............. 296/97.5, 97.6, 97.9, 296/97.12, 97.13

[56] References Cited

U.S. PATENT DOCUMENTS

| | | | |
|---|---|---|---|
| 1,465,374 | 8/1923 | Stetler | 296/97.9 X |
| 1,482,784 | 2/1924 | Churchill | 296/97.9 |
| 2,416,761 | 3/1947 | Lande | 296/97.9 |
| 2,634,161 | 3/1950 | Beets . | |
| 2,681,824 | 6/1954 | Knoblock | 296/97.9 |
| 2,829,919 | 4/1958 | Bartlett | 296/97.6 |
| 2,912,275 | 11/1959 | O'Neal . | |
| 3,066,973 | 12/1962 | Stewart | 296/97.13 |
| 3,191,986 | 6/1965 | Simon . | |
| 3,201,170 | 8/1965 | Weingarten | 296/97.6 |
| 3,246,925 | 4/1966 | Calabrese | 296/97.6 |
| 4,053,180 | 10/1977 | White | 296/97.6 |
| 4,248,473 | 2/1981 | Hildebrand | 296/97.6 X |
| 4,352,519 | 10/1982 | Aro | 296/97.6 |
| 4,690,450 | 9/1987 | Boerema et al. | 296/97.9 |
| 4,845,809 | 7/1989 | Pillifant, Jr. | 296/97.6 X |
| 4,858,982 | 8/1989 | Dykstra et al. . | |
| 5,213,389 | 5/1993 | Loftis et al. . | |
| 5,328,227 | 7/1994 | Pax, Jr. et al. | 296/97.9 X |

FOREIGN PATENT DOCUMENTS

| | | | |
|---|---|---|---|
| 1305142 | 8/1962 | France | 296/97.9 |
| 1396360 | 3/1965 | France . | |
| 2254452 | 7/1975 | France | 296/97.9 |
| 527066 | 10/1957 | Italy | 296/97.9 |

Primary Examiner—Joseph D. Pape
Attorney, Agent, or Firm—Price, Heneveld, Cooper, DeWitt & Litton

[57] ABSTRACT

A visor system includes nested coaxial pivot couplings for multiple visor panels which can be substantially flat, planer bodies which are positioned in closely adjacent relationship to one another by the mounting brackets and pivot about a common pivot axis when so nested. In one embodiment, the pivot coupling comprises a semi-cylindrical member with at least one nesting semi-cylindrical or cylindrical pivot rod attached to the visor panels and which coaxially align along a single, longitudinal axis. In other embodiments, a solid pivot rod is employed and is mounted to a visor panel to include an exposed section for snap-receiving a semi-cylindrical pivot socket of another visor panel.

20 Claims, 10 Drawing Sheets

MULTIPLE VISOR SYSTEM WITH CONCENTRIC PIVOT AXES

BACKGROUND OF THE INVENTION

The present invention relates to vehicle visors and particularly to multiple visors providing selective window coverage for the windshield, the side window, or both.

There exists a variety of multiple visor systems in which two or more visor panels are employed to provide windshield coverage, side window coverage, or both for the convenience of the vehicle operator or passenger. U.S. Pat. No. 4,858,982 represents a nested visor system in which multiple visor panels are employed and share mounting brackets for their controlled movement between stored and selective use position. This visor system includes a plurality of panels which nest to form, in appearance, a single visor when in a stored position or a front windshield use position. In this system, in order to provide simultaneous pivoting of the multiple panels, pivot axles are used which are offset. This adds somewhat to the complexity and therefore cost of both the mounting brackets and pivot axles for the visor installation. Also, the visor blades themselves typically include at least one concave blade for nestably receiving at least one of the remaining visor panels or blades.

SUMMARY OF THE INVENTION

The visor system of the present invention provides an improved mounting system for multiple visor panels by which nested or coaxial pivot couplings are employed for the multiple visor panels which can be substantially flat, planer bodies which are positioned in closely adjacent relationship to one another by the mounting brackets and pivot about a common pivot axis when so nested. In one embodiment, the pivot coupling comprises a semi-cylindrical member with at least one nesting semi-cylindrical pivot rod attached to the visor panels and which coaxially align along a single, longitudinal axis. In other embodiments, a solid pivot rod is employed and is mounted to a visor panel to include an exposed section for snap-receiving a semi-cylindrical pivot socket of another visor panel.

By providing overlapping pivot connections with a common longitudinal axis, the pivot mounting of multiple visor panels can be achieved with less expense and yet provide easy, controlled movement of the visor panels individually or jointly to their various use positions. Also, by providing co-axially aligned and nested pivot connections of each of the multiple visor panels, generally flat, planer panels can be employed and, when stored, lie in planes closely adjacent one another having the appearance of a single visor. Such visor panels can be moved as a unit from a raised, stored position to a lowered, forward windshield position and to successive use positions. These and other features, objects, and advantages of the present invention will become apparent to those skilled in the art upon reading the following description, together with reference to the accompanying drawings in which;

DETAILED DESCRIPTION OF THE PREFERRED EMBODIMENTS

Figure 1:
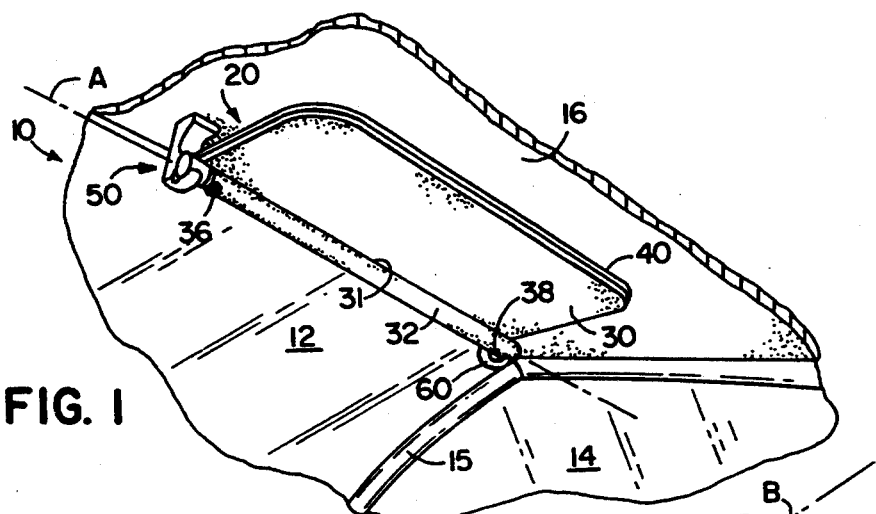
FIG. 1 is a perspective view of a first embodiment of a multiple visor installation constructed according to the present invention and shown in a first, stored position adjacent the vehicle roof.
Figure 2:
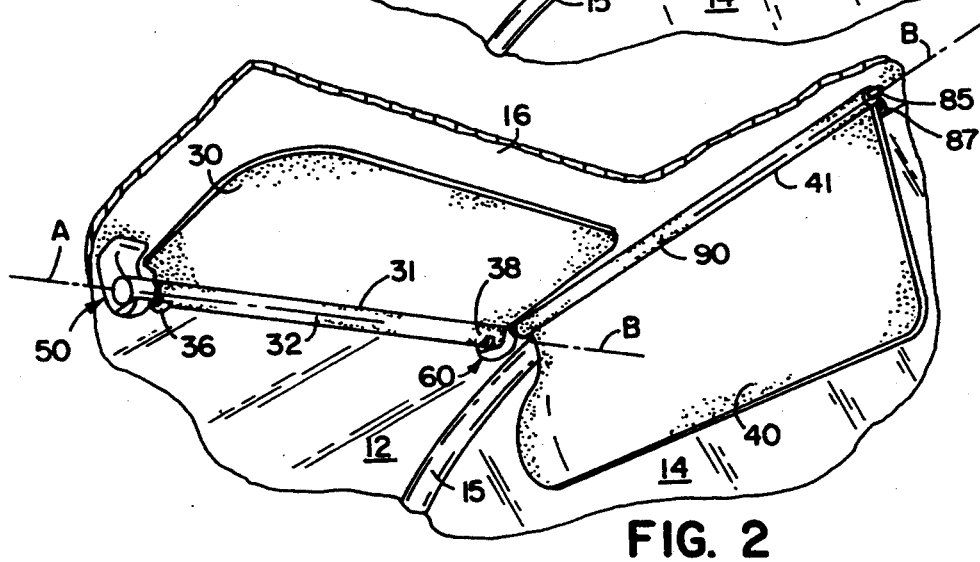
FIG. 2 is a perspective view of the visor system of FIG. 1 shown with the auxiliary visor panel moved to a side window position.
Figure 3:
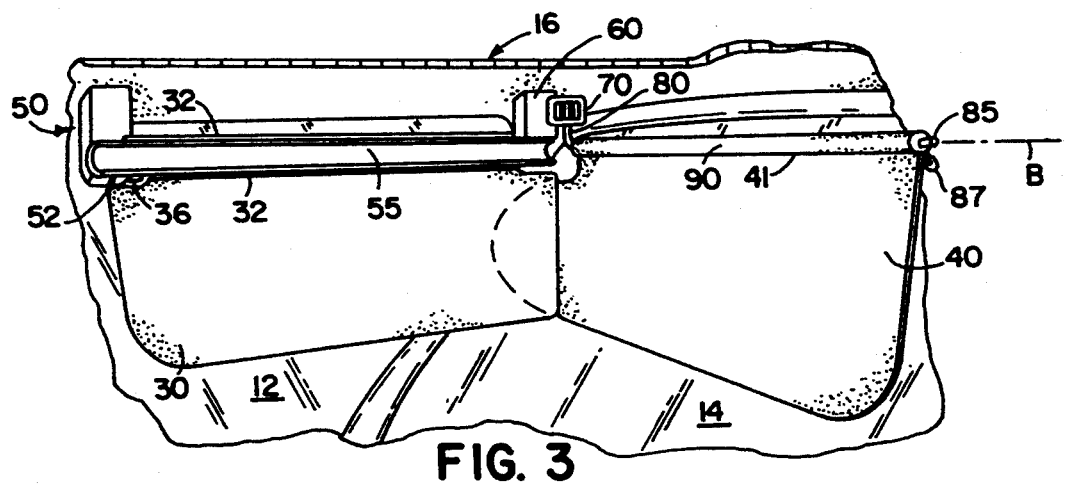
FIG. 3 is a perspective view of the visor system shown in FIG. 1 shown with the main visor in a lowered use position for simultaneously providing sun-blocking protection to the windshield and side window.
Figure 4:
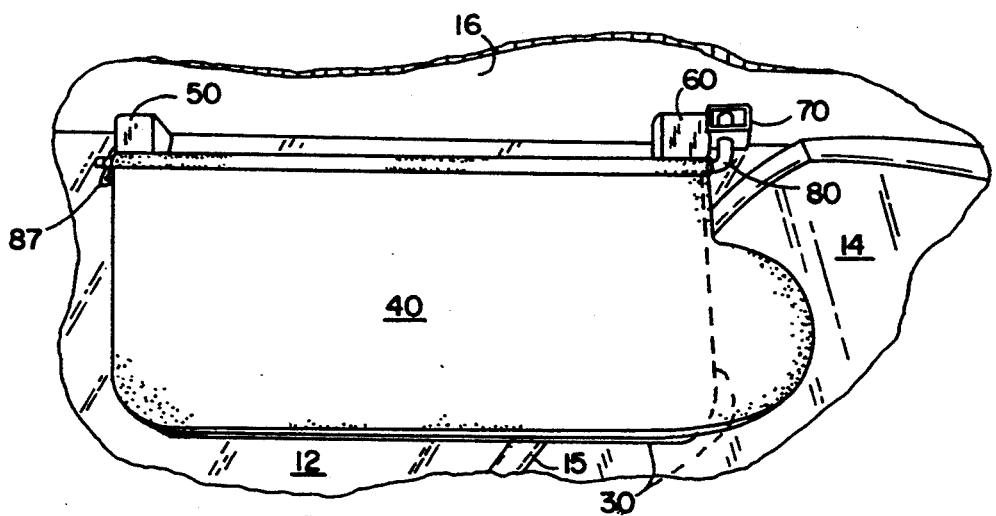
FIG. 4 is a front elevational view of the visor system shown in FIG. 1 shown with the visor panels in a nested position and lowered for front windshield use.

Retorting initially to FIGS. 1-4 there is shown a vehicle 10 such as an automobile having a front windshield 12 and a side window 14 separated by an A-pillar 15. The vehicle includes a visor system 20 embodying the present invention which is mounted to the roof 16 of the vehicle for movement between a raised, stored position as shown in FIG. 1 to first, second, and third lowered positions as illustrated in FIGS. 2-4. The visor system 20 shown is mounted to file passenger side of the vehicle and includes mounting brackets 50 and 60 which secure the visors of the system to either the vehicle headliner or to the sheet metal roof of the vehicle utilizing conventional fasteners or may use snap-in fasteners of the type illustrated in U.S. Pat. No. 4,989,911. The visor system of the present invention comprises a first or main visor 30, a second or auxiliary visor 40, and a mounting system for coupling the main and auxiliary visor panels for movement between a raised, stored position as shown in FIG. 1 and the selected use positions. For purposes of this description, the visor panels employed are referred to as main auxiliary visors, although they may likewise be referred to as front and side window visors respectively, or first and second visors.

The visor panels 30 and 40 are mounted co-axially about a common pivot axis A in FIGS. 1 and 2 such that they can move together from a stored position shown in FIG. 1 to a lowered front window sun blocking position as shown in FIG. 4 or the auxiliary visor panel 40 can be selectively moved to a side window blocking position as illustrated in FIG. 3. The main visor once lowered to a front window position as shown in FIG. 3 can remain in this position for maximum sunblocking, or it can be returned to a stored position as illustrated in FIG. 2. The co-axial mounting and nesting of the visor pivot rods associated with the main and auxiliary visors makes this movement possible and the use of relatively compact planer visor blades made of a polymeric material such as polycarbonate.

Figure 5:
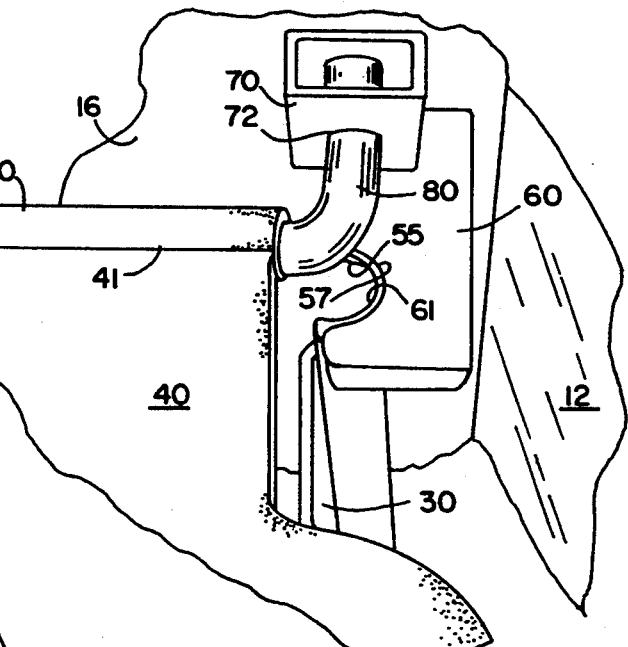
FIG. 5 is a right end perspective view of the mounting bracket for the visor system shown in FIGS. 1–4 shown with the visors in the position illustrated in FIG. 3.
Figure 6:
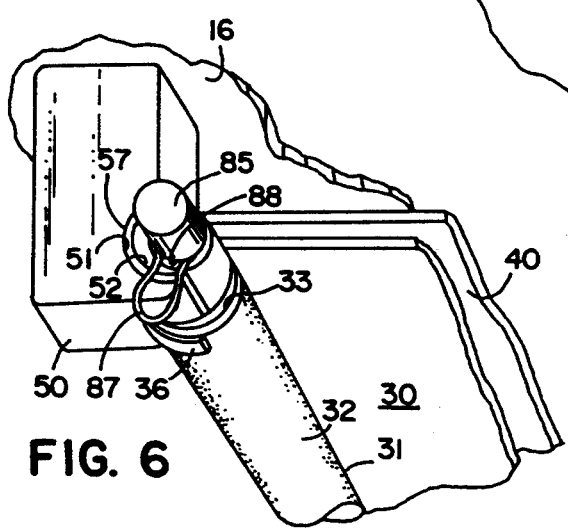
FIG. 6 is a left end perspective view of the visor system shown with the visors in the position illustrated in FIG. 1.

The unique mounting system for the main auxiliary visor panels 30 and 40 respectively includes a pair of spaced mounting brackets 50 and 60 with mounting bracket 50 being located at the left end of the visor assembly and mounting bracket 60 located at the right end of the visor assembly as viewed from within the vehicle 10. Extending between brackets 50 and 60 is a semi-cylindrical support member 52 for nestably receiving a semi-cylindrical pivot rod 32 integrally attached to the upper edge of the main visor panel 30. As best seen in FIGS. 3, 5, and 6, support 52 is fixedly supported at opposite ends within semi-cylindrical sockets 51 and 61 of brackets 50 and. 60 respectively using a bonding adhesive. The semi-cylindrical pivot rod 32 overlies support 52 and can thus rotate about axis A (FIGS. 1 and 2) and is captively held to the outer surface of member 52 by semi-cylindrical collars 36 and 38 (FIGS. 8 and 7) which extend from the inner edges of brackets 50 and 60 respectively and overly the outer surface of rod 32 to retain the pivot rod between brackets 50 and 60 and within support 52 and yet allow it to rotate. Pivot rod 32 has a radius of curvature for its inner surface 33 (FIG. 6) which is slightly greater than the radius of curvature of the outer surface 57 of stationary support 52 such that the pivot rod 32 co-axially extends over and surrounds support 52. Collars 36 and 38 partially circumscribe pivot rod 32 in an arc of approximately 180° of the outer surface 35 of pivot rod 32 for rotatably and captively holding the pivot rod 32 between stationary guide and support member 52 and outer guide collars 36 and 38. For such purpose, collars 36 and 38 have an inner radius of curvature slightly greater than the radius of curvature of the outer surface 35 of pivot rod 32 and thereby, allow the pivot rod to rotate about the pivot axis A as seen in FIGS. 1-4 freely between mounting brackets 50 and 60.

Figure 7:
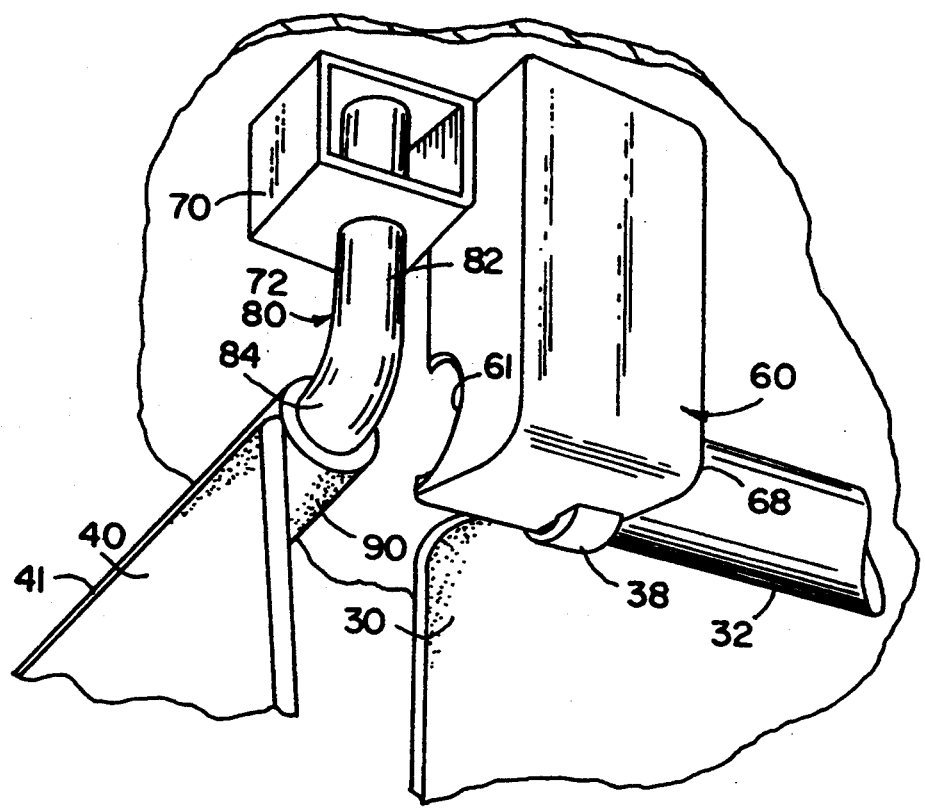
FIG. 7 is a front perspective view of the right mounting brackets for the visor system shown with the visor panels in a position shown in FIG. 3.
Figure 8:
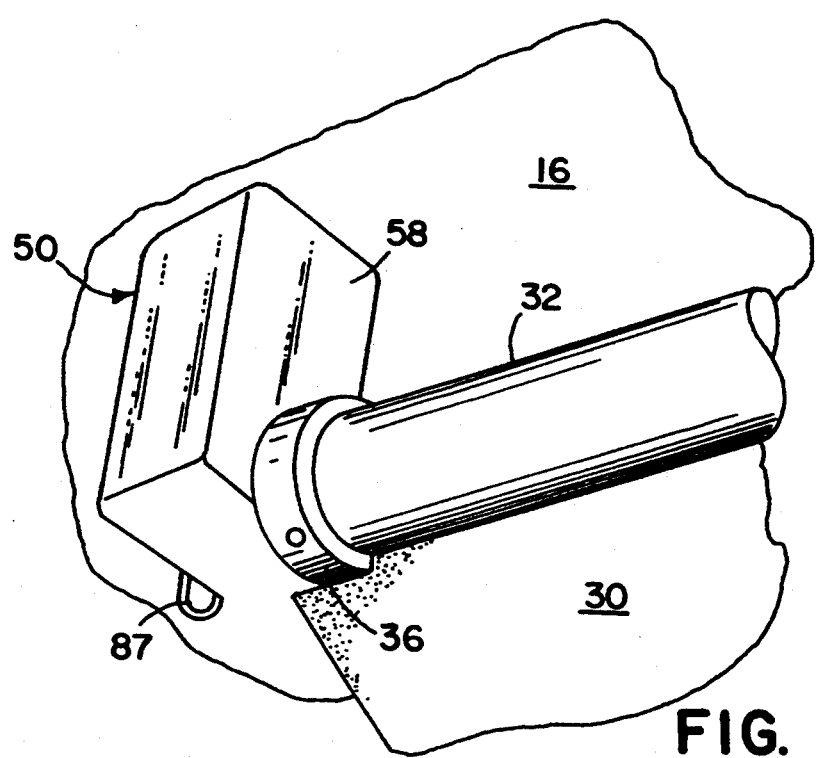
FIG. 8 is a perspective view of the left end of the left visor bracket with the visor panels shown in a nested position illustrated in FIG. 1.

Mounting bracket 60 integrally includes an end block 70 having a generally vertically extending bore 72 as best seen in FIGS. 5 and 7 for lockably receiving a pivot rod elbow 80 having one end 82 rotatably secured within born 72 of block 70 in a conventional manner such as utilizing a spring and Tinnerman nut conventionally used for mounting visor pivot rods to such brackets. For such purpose, the upper end of block 70 provides clearance in the form of a recess communicating with bore 72 for allowing such mounting of the end 82 of elbow 80. Bore 72 is aligned with, but orthogonal to the axis A of pivot rod 32.

Elbow 80 has a leg 84 which extends through a cylinder 90 defining the pivot rod for auxiliary visor panel 40. For such purpose, cylinder 90 is integral with or otherwise secured to the upper edge 41 of auxiliary panel 40 with the end 85 of elbow 80 extending entirely through the cylinder 90 as seen in FIG. 6. Cylinder 90 is captively held to the rod end of elbow 80 and particularly to the end 85 of rod 84 by any conventional means such as a keeper pin 87, shown for purposes of illustration, it being understood that in a commercial embodiment of the invention, cylinder 90 may include inwardly projecting keeper tabs which interlock and within an annular concentric slot 88 of rod 84 which receives keeper pin 87 in the embodiment shown.

As seen in FIG. 3, support member 52 presents a semi-cylindrical inner surface 55 which nestably and rotatably receives the outer surface 91 of cylindrical pivot rod 90 of the auxiliary visor 40. Thus, the auxiliary visor panel 40 is pivotally mounted to leg 84 of pivot rod 80 to move between raised and stored positions seen in FIGS. 1 and 2 and can pivot from a front window position as seen in FIGS. 1 and 4 to a side window position as shown in FIGS. 2 and 3. A suitable torque control extends between rod 84 and cylinder 90 for controlling the movement of the auxiliary visor panel 30 about its pivot axis B (FIGS. 2 and 3) so it can remain in a selected, adjusted position with respect to the side window 14. The desired torque may be achieved by appropriate selection of the inner diameter of cylinder 90 with respect to the outer diameter of the rod end 84 of elbow 80.

As can be seen, the pivot axis B of the auxiliary visor panel 40 co-axially aligns with pivot axis A when the visors are in a nested relationship as seen in FIGS. 1 and 4 with the co-axial mounting of the visors permitting panels 30 and 40 to lie closely adjacent to one another in a compact, stored relationship as seen in FIG. 1 or for use as a single, front window visor as illustrated in FIG. 4. By providing the nested, co-axial mounting of the visor panels, and particularly the co-axial pivot rod mounting ease of operation of the multiple visor system shown is achieved. An alternative embodiment of the invention, which also uses nested co-axial pivot rods connections, which can be selectively decoupled from one another for an auxiliary visor system is illustrated in FIGS. 9-16 which is now described.

Figure 9:
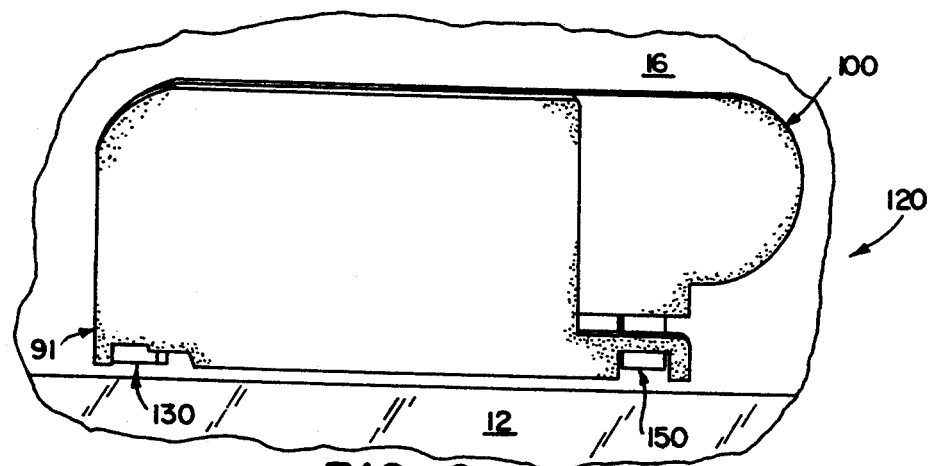
FIG. 9 is a perspective view of another embodiment of the invention shown with the visors in a raised, stored position.
Figure 10:
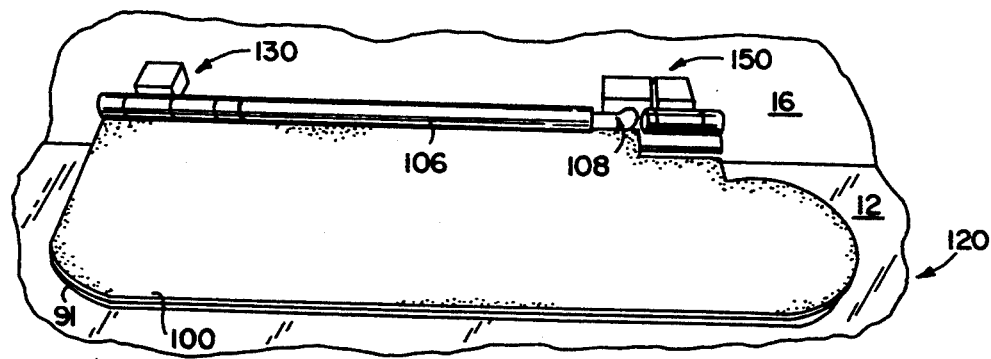
FIG. 10 is a perspective view of the visor system shown in FIG. 9 with the visors in a lowered, first use position adjacent the front windshield of a vehicle.
Figure 11:
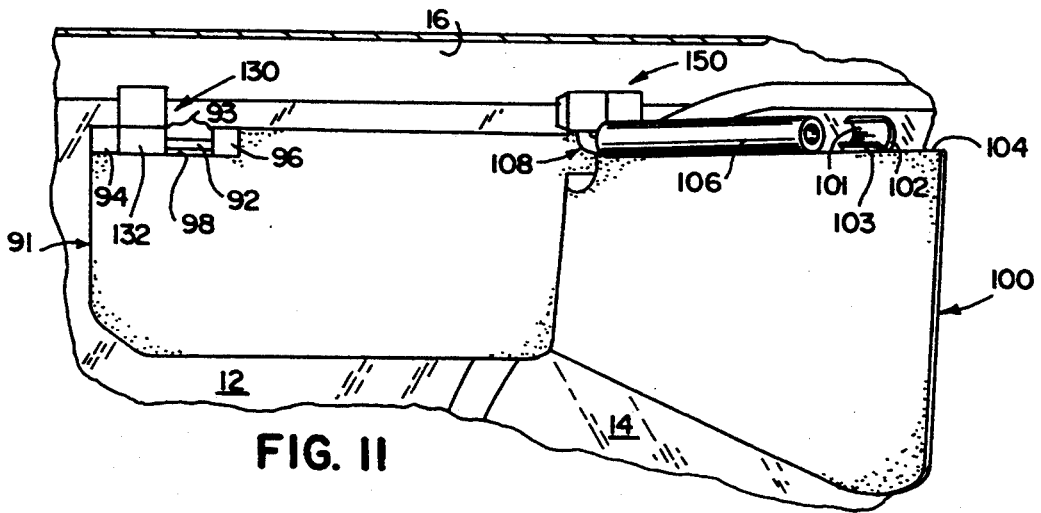
FIG. 11 is a perspective view of the visor system shown in FIG. 10 but with the auxiliary visor panel moved to a side window position.

Turning now to FIGS. 9-11, initially, there is shown a multiple visor installation 120 including a first or main visor 91 and a second or auxiliary visor 100 which move between a nested, stored position adjacent the vehicle roof 16 as seen in FIG. 9 to a first, lowered use position with both visor panels substantially together and adjacent the front windshield 12 in a forward, sun blocking position as seen in FIG. 10. In addition, visor 100 can be moved independently of visor 91 as illustrated in FIG. 11 with the visor panel 100 being selectively moved to a side window position for blocking sunlight from the side window 14. In this position the main visor panel 91 can either be in a lowered, sun blocking position as seen in FIG. 11 or movable to a raised, stored position against the vehicle roof 16.

Figure 12:
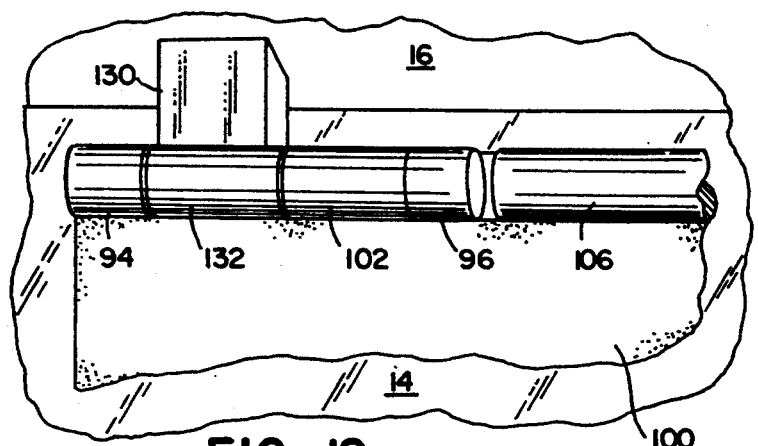
FIG. 12 is an enlarged, rear elevational view of the left end mounting bracket shown with the visors in the position illustrated in FIG. 10.
Figure 15:
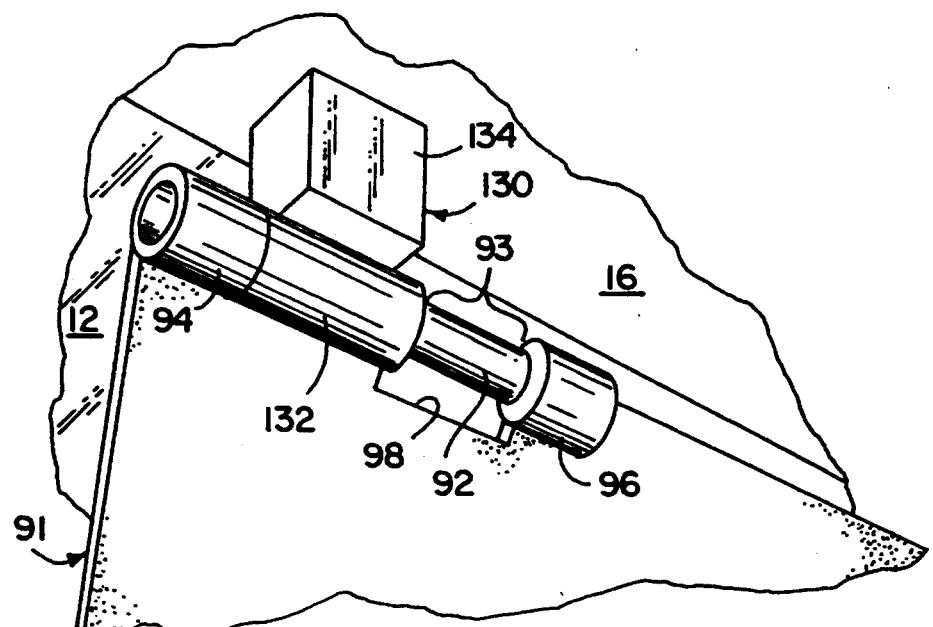
FIG. 15 is a perspective view of the left end of the main visor panel shown with the visors in the position of FIG. 11.

The visor installation 120 shown in these figures is shown as the passenger side visor in a vehicle such as an automobile and the main visor 91 is supported between a left pivot mounting assembly 130 and a right pivot mounting assembly 150. The main or first visor 91 is pivoted only between a raised, stored position as shown in FIG. 9 and a lowered, use position shown in FIGS. 10 and 11 and, for such purpose, includes a pivot axle 92 mounted in spaced relationship away from the plane of the visor panel 91 near a top edge of the visor panel by means a pair of collars 94 and 96 which mount the cylindrical pivot rod 92 in the upper left corner of the visor as best seen in FIGS. 12 and 15. The pivot rod 92 rotatably extends through, and is supported by a cylindrical collar 132 mounted to a block 134 of the mounting assembly 130 to support the left end of visor panel 91 in rotational engagement with roof 16.

The right end of visor panel 91 similarly is secured by means of a short pivot rod 95 (FIG. 13) which is mounted in spaced relationship to the body of visor panel 91 by means of a pair of collars 97 and 98 at the upper right corner of visor panel 91. Rod 95 rotatably extends within and is supported by a cylindrical collar 152 mounted to a mounting block 154 of mounting assembly 150 to rotatably support the right corner of the main or first visor 91. As best seen in FIG. 15, a section 93 of pivot rod 92 is exposed between mounting collars 96 and rotational supporting collar 132. This cylindrical section 93 forms a support for the left end of the auxiliary or second visor 100 as described below. Thus, the main visor panel 91 is supported for pivotal motion between a raised stored position against the vehicle roof and a lowered, use position with the inner diameters of the polymeric support collars 132 and 152 being selected with respect to the outer diameter of the associated pivot rods 92 and 95 respectively to provide a predetermined, rotational torque allowing pivoting of the visor 91, but holding the visor in a selected lowered use or a raised position. In a preferred embodiment of the invention, the mounting bracket assemblies 130 and 150, as well as pivot rods 92 and 95, and their respective support collars were made of a polymeric material such as polycarbonate.

The auxiliary visor panel 100 is mounted at its left end to section 93 of pivot rod 92 by means of a semi-cylindrical snap-over collar 102 (FIGS. 11 and 14) and which has a concave, semi-circular opening 101 which is aligned with, and snaps over section 93 of pivot rod 92 of the main visor panel as best seen in FIGS. 10 and 12. For such purpose, an edge 103 (FIG. 11) of mounting socket 102 is secured to the top edge 104 of visor 100 in longitudinal alignment to fit within a slot 98 in visor panel 91 below and behind section 93 of visor rod 92. Socket 102 has an inner circumferential diameter and circumscribes approximately 180° of the visor rod 92 such that it snap-fits over and snugly attaches and rotates around visor rod 92 for rotatably supporting the auxiliary visor panel 100 with respect to visor mount 130 in co-axial alignment with the axis of rotation of the main visor panel 91.

Figure 13:
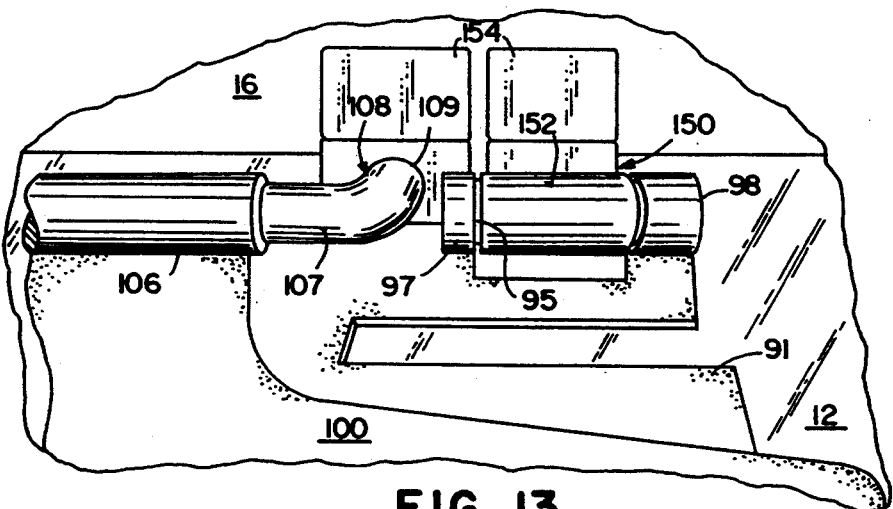
FIG. 13 is an enlarged, perspective view of the right end mounting bracket for the visors shown with the visors in the position shown in FIG. 10.
Figure 14:
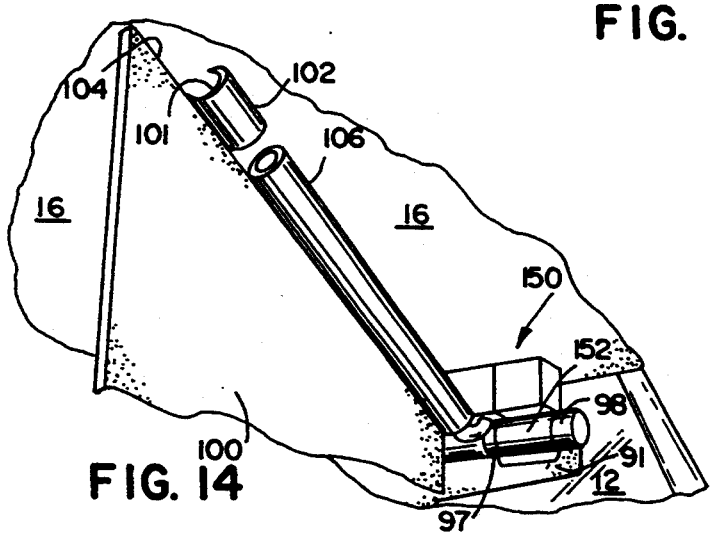
FIG. 14 is an end perspective view of the left end of the auxiliary visor panel shown in the side window position.
Figure 16:
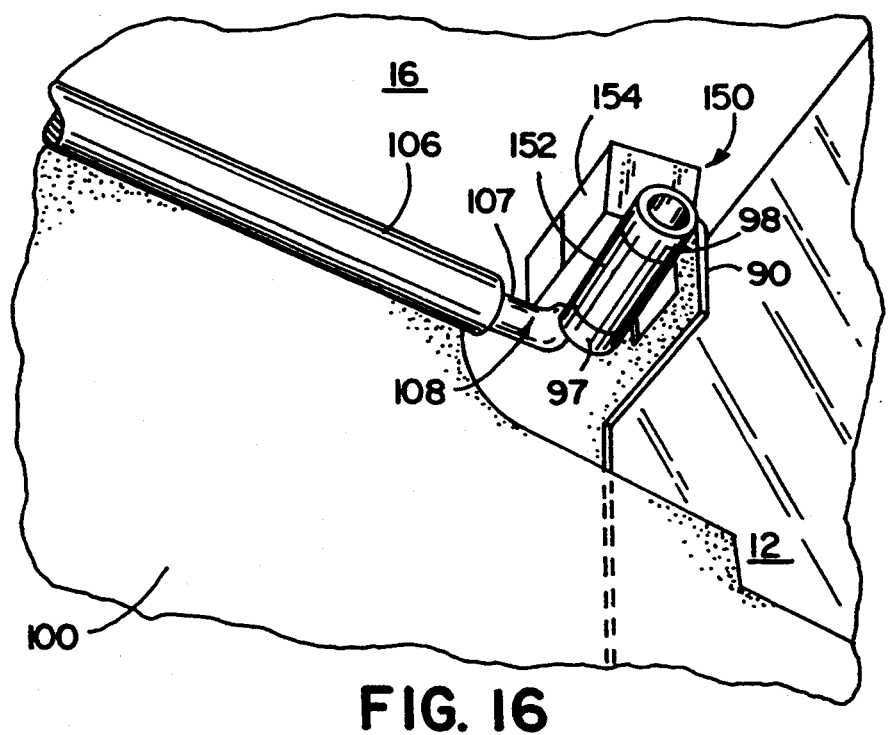
FIG. 16 is an enlarged, perspective view of the right end of the right bracket of the visor assembly as viewed through the passenger side window.

Extending along the upper edge 104 of panel 100 in spaced relationship to socket 102 is cylindrical support 106 which receives, as best seen in FIGS. 13 and 16, one end 107 of a pivot rod elbow 108 with the opposite end 109 (FIG. 13) of the L-shaped elbow 108 extending into and rotatably supported within block 154 and secured therein by suitable attachment means such as a keeper spring and nut in a conventional manner. The axis of end 107 of pivot elbow 108 is aligned with the longitudinal axis of pivot rods 92 and 95 such that panel 100 moves co-axially with the rotation of panel 91. End 107 of pivot rod 108 is secured within cylindrical sleeve 106 in a conventional manner such as providing an annular groove around the pivot rod 107 and an axially inwardly extending keeper pin (not shown) in sleeve 106 such that the auxiliary visor panel 100 will remain on the pivot rod end 107 when moved to a side window position as illustrated in FIG. 11. The outer diameter of end 107 of pivot elbow 108 snugly fits within the inner, cylindrical diameter of sleeve 106 to provide a controlled, rotational torque between the auxiliary visor 100 and pivot rod 108 such that panel 100 can be selectively moved and held in any desired rotationally adjusted side window position.

The visor system 120 shown in FIGS. 9-16 thus, provide the nested, co-axial mounting of main visor panel 91 and auxiliary visor panel 100 with socket 102 snap-fitting over a section of the pivot rod 92 of the main visor for nestably overlapping and co-axially mounting the left ends or the visors and with the co-axial alignment of pivot rods 107 and 95 at the right end to provide the desired, independent and movement of the auxiliary visor panel 100 to the side window position as desired. Panels 91 and 100 may, as in the first embodiment, be molded of a suitable polymeric material as can be the various mounting brackets associated with each of the visor panels. However, for assembly, pivot rod 92 is installed between collars 94 and 96, which may be integrally molded to panel 91, and simultaneously inserted within bracket 130. Each of the bracket blocks 134 and 154 can be integral and secured to the vehicle roof 16 by conventional fastening means, either fastening screws or by snap-in fasteners for attaching the visor system 120 to the headliner and/or the underlying vehicle roof depending on the installation.

Figure 17:
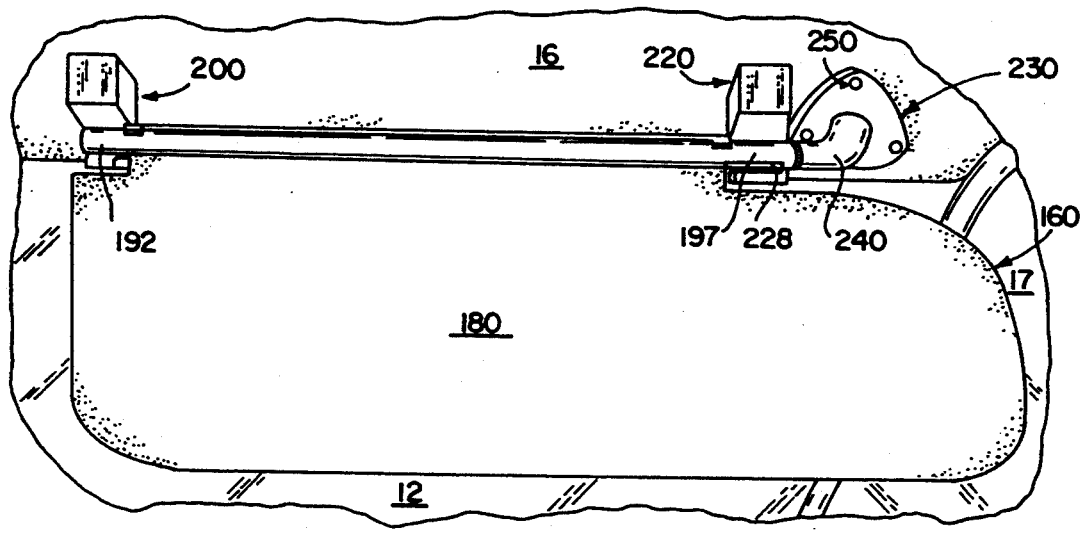
FIG. 17 is a perspective view of an alternative embodiment of the present invention showing the multiple visors in a first, lowered position adjacent to the windshield.
Figure 18:
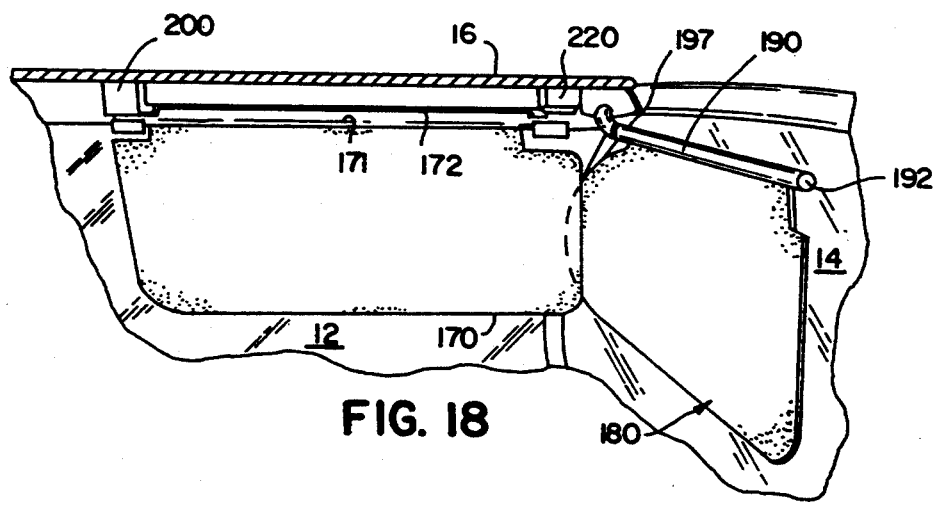
FIG. 18 is a perspective view of the visor system shown in FIG. 17 with the auxiliary visor in a lowered, side window position.
Figure 21:
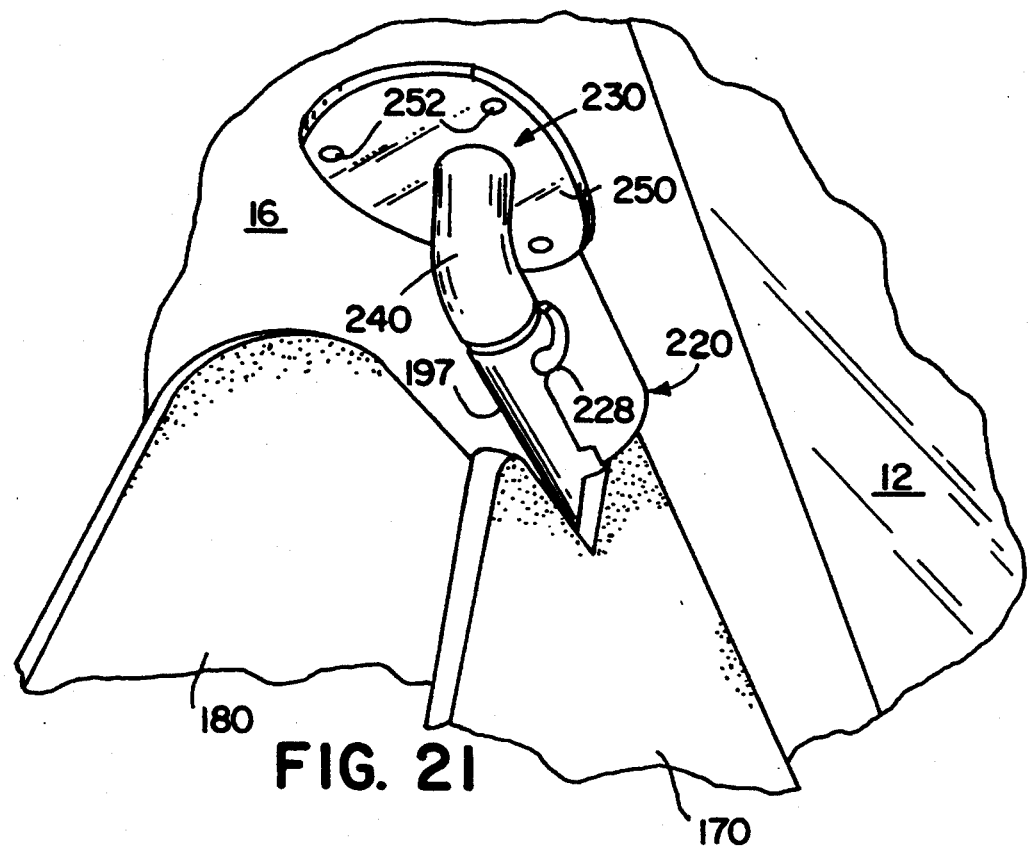
FIG. 21 is an enlarged, right end perspective view taken through the windshield of the bracket assembly of the visors shown in the position illustrated in FIG. 17.
Figure 22:
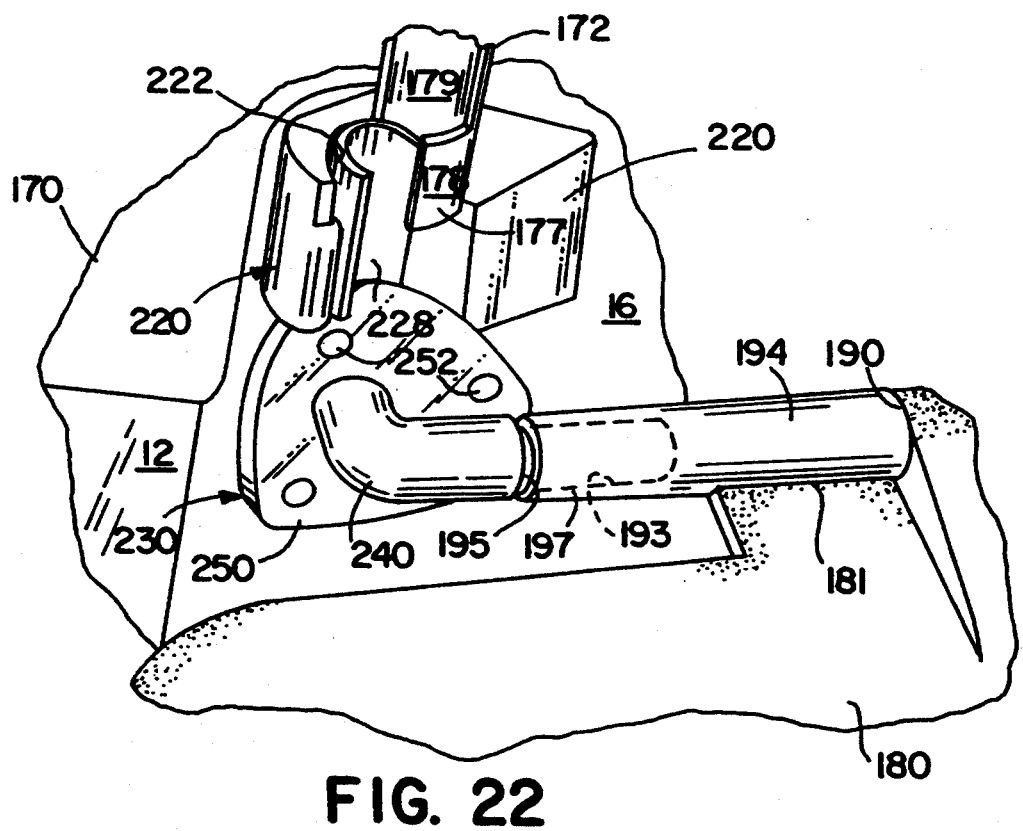
FIG. 22 is an enlarged, bottom perspective view of the visor mounting bracket shown in FIG. 21 with the auxiliary visor moved to the side window position as shown in FIG. 18.
Figure 23:
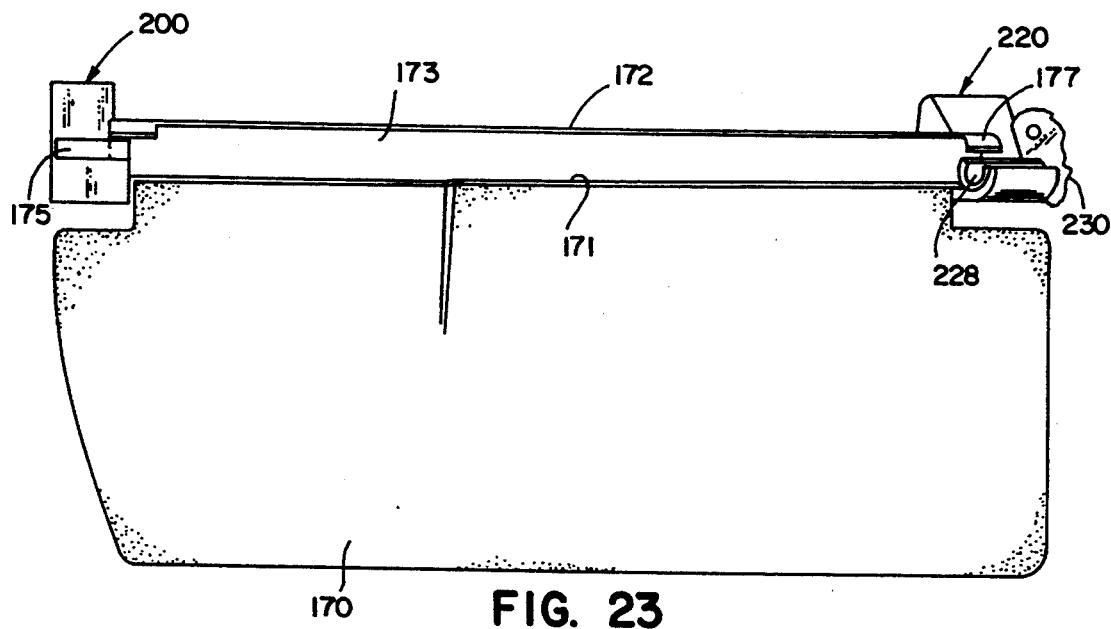
FIG. 23 is a real elevational view of the main visor and pivot rod.
Figure 24:
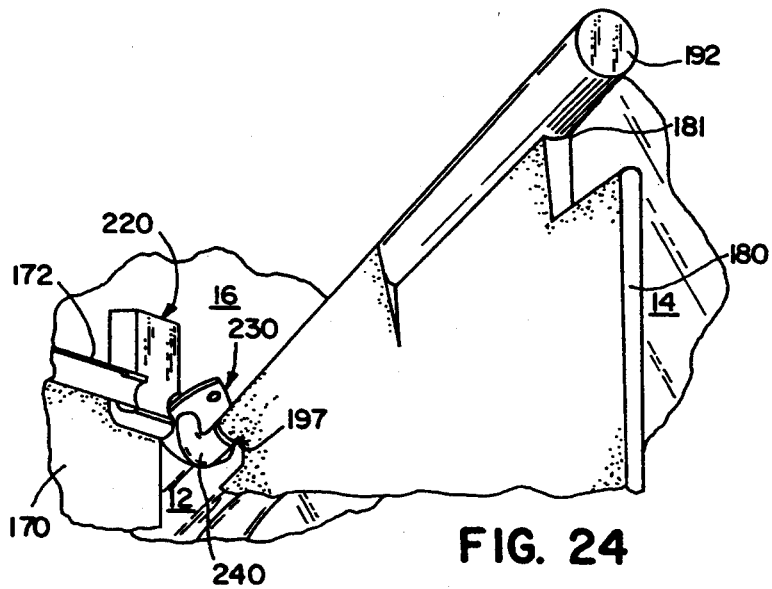
FIG. 24 is an enlarged, fragmentary perspective view of the left end of the auxiliary visor panel of the visor installation illustrated in FIGS. 17-23.

A third embodiment of the invention sharing characteristics similar to that of the first and second embodiments of the invention is shown in FIGS. 19-24 in which a multiple visor installation 160 is shown and which includes a main or first visor 170 and a second or auxiliary visor 180 both mounted to the roof 16 of a vehicle for simultaneous movement to a first lowered, use position adjacent to the vehicle windshield 12 as seen in FIG. 17 or independent movement with the auxiliary visor 180 adjacent the side window 14 as seen in FIG. 18. In the embodiment shown, the main visor 170 includes a semi-cylindrical support 172 integrally formed with the planar visor panel and extending along the length of upper edge 171 of the visor panel as best seen in FIG. 18. Semi-cylindrical member 172 thus, defines a semi-cylindrical socket 173 as best seen in FIG. 23 with a left end 175 and a right end 177 (FIGS. 20 and 22 respectively) which are rotatably supported by left and right mounting brackets 200 and 220 respectively.

Figure 19:
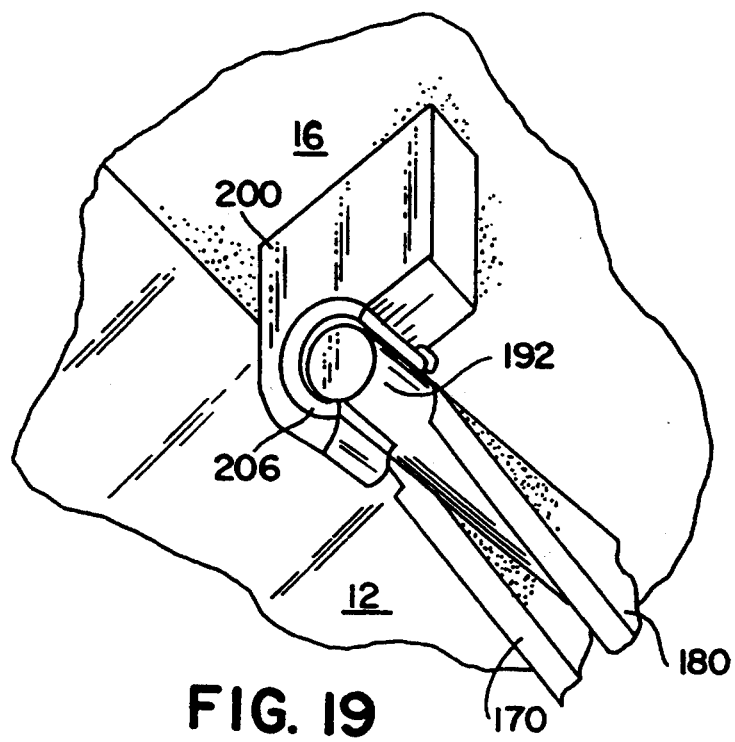
FIG. 19 is an enlarged, perspective view of the left side visor bracket shown with the visors in a position illustrated in FIG. 17.
Figure 20:
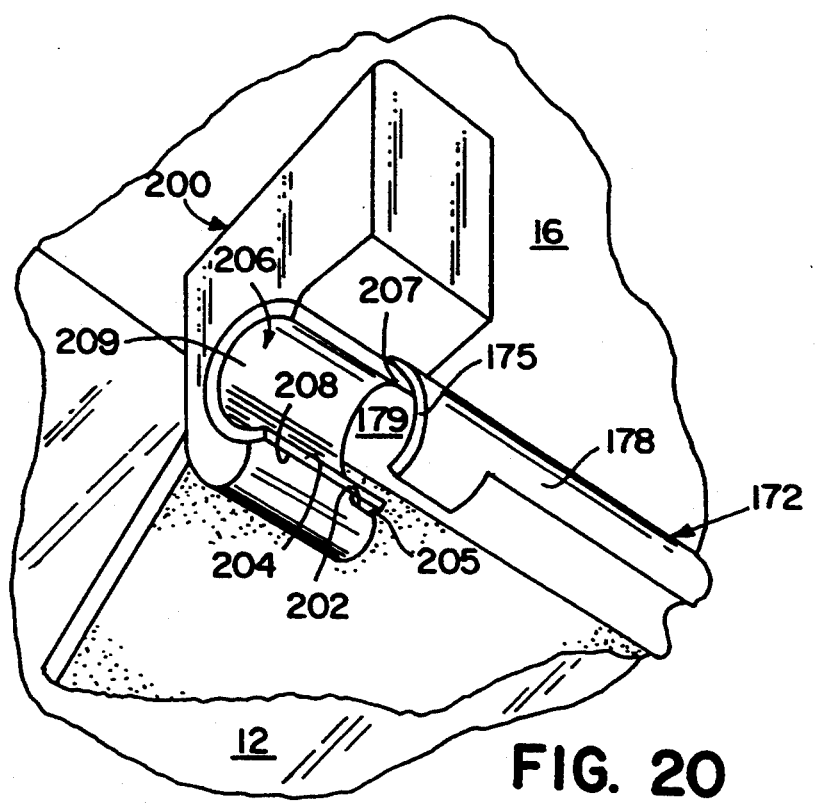
FIG. 20 is an enlarged, perspective view of the mounting bracket shown in FIG. 19 but shown with the auxiliary visor moved to the side window position as shown in FIG. 18.

Bracket 200 is best seen in FIGS. 19, 20, and 23 and includes a semi-cylindrical socket 202 at its inner edge having a semi-cylindrical surface of substantially the same radius of curvature as that of the outer semi-cylindrical surface 178 of pivot rod 172. Bracket 200 also includes a raised, semi-cylindrical recess 204 for supporting a semi-cylindrical inner support member 206 having an end 207 which extends within and captively engages the inner cylindrical surface 179 of pivot rod 172 as best seen in FIG. 20. Thus, the outer surface 208 of member 206 and inner surface 202 of bracket 200 define an annular slot 205 which captively receives the semi-cylindrical stub end 175 of pivot rod 172 for rotational engagement with bracket 200. The inner surface 209 of member 206 defines a socket for receiving an end 192 of the auxiliary visor panel 180 as described below.

The right side mounting bracket 220 is similarly constructed as best seen in FIGS. 21 and 22 to include a inner cylindrical support sleeve 228 engaging the inner cylindrical surface of end 177 of pivot rod 172 and a spaced outer cylindrical surface 222 for engaging the outer semi-cylindrical surface of end 177 of pivot rod 172. Tires, member 228 and surface 222 of member 220 define an annular slot for rotatably receiving and supporting end 177 of the pivot rod 172. Both brackets 200 and 220 are mounted to the vehicle roof 16 in a conventional fashion using fastening screws or snap-in fasteners. Member 228, like member 206, presents a semi-cylindrical socket for receiving, in conjunction with the elongated socket 173 of pivot rod 172, the pivot rod associated with auxiliary visor panel 180 as now described.

Extending along the top edge 181 of visor 180 is an integrally formed, cylindrical pivot rod 190 which has a solid, cylindrical stub end 192 (FIG. 24) which is snap received by member 206 as best seen in FIG. 19. The opposite end 194 of pivot rod 190 includes a journaled, cylindrical recess 193 for receiving a pivot axle 195 extending within the recess of pivot rod 190 as shown in phantom form in FIG. 22. Pivot axle 195 is rotatably supported within recess 193 of pivot rod 190 in a conventional manner to provide a predetermined rotational torque between pivot rod 190 and pivot axle 195 which has its opposite end remote from rod 190 mounted in fixed relationship to a conventional visor pivot rod mounting bracket 230. Bracket 230 includes an elbow 240 which is rotatably supported to a triangular mounting flange 250 which in turn is secured to the vehicle roof by means of fasteners extending through mounting apertures 252 at spaced locations.

The bracket 230, as best seen in FIGS. 17 and 18, is mounted in relationship to bracket 220 so that the axes of rotation of pivot rod 190 and pivot rod 172 of the auxiliary and main visors respectively are co-axially aligned with the socket formed by member 228 receiving the section 197 (FIG. 22) of pivot rod 190 in snap receiving engagement as best seen in FIG. 17. In the preferred embodiment of the invention brackets 220 and 230 can be integrally made with the pivot elbow 240 being secured within such an integral bracket in a conventional manner. By providing the cylindrical socket 173 along the upper edge of the main visor, the auxiliary visor pivot rod 190 is captively held in a closely adjacent relationship to the main visor for movement of the two visor panels together between a raised, stored position adjacent the vehicle headliner and the lowered, use position shown in FIG. 17. The outer diameter of pivot rod 190 and the inner diameter of socket 173 permits the auxiliary visor panel 180 to be separated from the main visor panel for use in the side window sun blocking position as seen in FIG. 18 in which the main visor panel 170 can be lowered as illustrated or raised adjacent the vehicle roof 16.

Thus, in each embodiment, co-axially mounted and nesting semicylindrical pivot rods are employed in the multiple visor installations to provide a compact mounting relationship of a pair of planer visors to permit their independent movement with relative ease to a variety of selectable sun blocking positions. It will become apparent to those skilled in the art that various modifications to the preferred embodiments of the invention described herein can be made without departing from the spirit or scope thereof as defined by the appended claims.

The embodiments of the invention in which an exclusive property or privilege is claimed are defined as follows:

1. A visor system for a vehicle comprising:
   first and second visor panels for mounting to a vehicle for movement between a position in which said first and second panels are proximate one another with their planes generally parallel to selected spaced-apart use positions; and
   a first mounting bracket and a second mounting bracket for movably mounting said first and second visor panels to the vehicle for pivoting movement along a common pivot axis, a cylindrical pivot axle on one of said first and second visor panels and a semi-cylindrical pivot axle on the other of said first and second visor panels and wherein said cylindrical and semi-cylindrical pivot axles are coupled at least at one end to said first mounting bracket and wherein one of said cylindrical and semi-cylindrical pivot axles has an opposite end coupled to said second mounting bracket such that said cylindrical and semi-cylindrical pivot axles are aligned to nest when said first and second visor panels are in said position proximate one another and are offset from one another when said first and second visor panels are moved to selected spaced-apart positions.

2. The visor system as defined in claim 1 wherein said first visor panel includes said semi-cylindrical pivot axle and said second visor panel includes said cylindrical pivot axle.

3. The visor system as defined in claim 2 wherein said first visor panel includes an edge and wherein said semi-cylindrical pivot axle extends along said edge.

4. The visor system as defined in claim 3 wherein said semi-cylindrical pivot axle extends substantially along the length of said edge.

5. A visor system for a vehicle comprising:
   first and second visor panels for mounting to a vehicle for movement between a position in which said first and second panels are proximate one another with their planes generally parallel to selected spaced-apart use positions; and means for movably mounting said first and second visor panels to the vehicle for pivoting movement along a common pivot axis, wherein said mounting means includes a cylindrical pivot axle on one of said first and second visor panels and a semi-cylindrical pivot axle on the other of said first and second visor panels and wherein said cylindrical and semi-cylindrical pivot axles are aligned to nest when said first and second visor panels are in said position proximate one another, wherein said first visor panel includes an edge and said semi-cylindrical pivot axle extends substantially along the length of said edge and said second visor panel includes said cylindrical pivot axle; and wherein said mounting means further includes a pair of spaced mounting brackets including semi-cylindrical socket means for rotatably supporting opposite ends of said semi-cylindrical pivot axle.

6. The visor system as defined in claim 5 wherein said mounting means further includes a pivot elbow mount coupled to said cylindrical pivot axle for mounting one end of said cylindrical pivot axle in orthogonally pivoted relationship to the rotation of said semi-cylindrical pivot axle.

7. The visor system as defined in claim 6 wherein said cylindrical pivot axle includes a solid pivot rod.

8. The visor system as defined in claim 7 wherein said cylindrical pivot axle further includes a hollow cylindrical member extending over said solid pivot rod.

9. The visor system as defined in claim 6 wherein said cylindrical pivot axle is a solid pivot rod having one end rotatably mounted to an end of said pivot elbow remote from said one end.

10. The visor system as defined in claim 1 wherein said first visor panel includes a cylindrical pivot axle comprising a solid pivot rod mounted in spaced relationship from the plane of said first visor panel along one edge thereof.

11. The visor system as defined in claim 10 wherein said second visor panel includes said semi-cylindrical pivot axle having an open side facing and partially circumscribing said pivot rod of said first visor panel when said visor panels are in said position proximate one another.

12. The visor system as defined in claim 11 wherein said pivot rod and said semi-cylindrical pivot axle extend only partially along an edge of the respective visor panels to which they are mounted.

13. A visor system for a vehicle comprising:
first and second mounting brackets to be mounted in spaced aligned relationship to one another in a vehicle, each bracket including an arcuate slot formed in an end thereof which faces the opposite bracket when installed;
a visor panel including a semi-cylindrical pivot axle extending along one edge thereof with ends captively and rotatably held within said slots of said first and second mounting brackets to permit said visor panel to rotate between a raised stored position and a lowered use position.

14. The visor system as defined in claim 13 and further including a second visor panel having a pivot rod mounted along an edge thereof, and an elbow bracket mounting said second visor for movement between a position in which said pivot rod is nested within said semi-cylindrical pivot axle and a position remote therefrom.

15. A visor system for a vehicle comprising:
a pair of mounting members for mounting to a vehicle roof in spaced relationship, said members each including a pivot rod mounted thereto;
a first visor panel including a pair of cylinders mounted to an edge of said visor panel and overlying said pivot rods for pivotally mounting said visor panel to said mounting members; and
a second visor panel including a pivot elbow extending from one edge into one of said mounting members, and a semi-cylindrical socket spaced from said pivot elbow for selectively engaging one of said pivot rods for removably holding said second visor panel proximate said first visor panel.

16. A visor system for a vehicle comprising:
a pair of mounting members for mounting to a vehicle roof in spaced relationship, said members each including a pivot rod mounted thereto; and
a visor panel including a pair of cylinders mounted to an edge of said visor panel and overlying said pivot rods for pivotally mounting said visor panel to said mounting members; wherein one of said pivot rods includes a section which extends beyond said cylinder of said visor panel, said system further including a second visor panel including a semi-cylindrical socket aligned with said section of said one pivot rod to removably snap-fit thereover and a pivot elbow coupled to said second visor for allowing movement of said second visor panel between positions proximate said visor panel and remote therefrom.

17. A multiple panel visor system comprising:
first and second visor panels for mounting to a vehicle for movement between a position in which said first and second panels are proximate one another with their planes generally parallel to selected spaced-apart use positions; and means for movably mounting said first and second visor panels to the vehicle for pivoting movement along a common pivot axis, wherein said mounting means includes a cylindrical pivot axle on one of said first and second visor panels and a semi-cylindrical pivot axle on the other of said first and second visor panels and wherein said cylindrical and semi-cylindrical pivot axles are aligned to nest when said first and second visor panels are in said position proximate one another; said mounting means further including at least a pair of spaced mounting brackets for rotatably mounting said semi-cylindrical pivot axle to the vehicle for movement of said visor panels between a raised stored position adjacent the vehicle roof and a lowered use position, said mounting means further including an elbow mounted to said cylindrical pivot axle for movement of the associated visor panel along an axis orthogonal to the remaining visor panel.

18. A multiple panel visor system comprising:
first and second generally planar visor panels; and
means for movably mounting said first and second visor panels to a vehicle for pivoting movement along a common pivot axis, wherein said mounting means includes a cylindrical pivot axle on one of said first and second visor panels and a semi-cylindrical pivot axle on the other of said first and second visor panels and wherein said cylindrical and semi-cylindrical pivot axles are aligned to nest when said first and second visor panels are in a stored position with their planes generally parallel to one another; said mounting means further including at least a pair of spaced mounting brackets for rotatably mounting one of said cylindrical and semi-cylindrical pivot axles to the vehicle for movement of said visor panels between a raised stored position adjacent the vehicle roof and a lowered use position, said mounting means further including an elbow mounted to the other of said cylindrical and semi-cylindrical pivot axles for movement of the associated visor panel along an axis orthogonal to the remaining visor panel.

19. A visor system comprising:

a first generally planar visor body integrally including a semi-cylindrical pivot axle formed along one edge thereof and extending from opposite sides of said visor body;

a pair of spaced mounting brackets for mounting said first visor body to a vehicle, each of said mounting brackets including an annular slot formed therein for captively and rotatably receiving an end of said semi-cylindrical pivot axle;

a second generally planar visor body integrally including a cylindrical pivot rod extending along at least a portion of one edge thereof and shaped to fit within said semi-cylindrical pivot axle of said first visor body; and an elbow coupled to said cylindrical pivot rod for mounting said second visor body for rotation on the same axis as said first visor body when said cylindrical pivot rod is in said semi-cylindrical pivot axle and allow said second visor body to rotate about and axis orthogonal to said first named pivot axis when said second visor body is remote from said first visor body.

20. A visor mounting system comprising:

a pair of spaced mounting brackets having a semi-cylindrical member extending therebetween;

a first visor body having a semi-cylindrical pivot axle extending along one edge thereof and rotatably coupled to said mounting brackets to nest with said semi-cylindrical member;

a second visor body having a pivot axle extending along an edge thereof to nest with one of said semi-cylindrical member and semi-cylindrical pivot axle; and an elbow for mounting said pivot axle for rotation along axes coaxial with said first visor panel and orthogonal to said first visor panel.

* * * * *

UNITED STATES PATENT AND TRADEMARK OFFICE
CERTIFICATE OF CORRECTION

PATENT NO. : 5,421,632

DATED : June 6, 1995

INVENTOR(S) : Mark E. Adomeit et al.

It is certified that error appears in the above-indentified patent and that said Letters Patent is hereby corrected as shown below:

Col. 3, line 3;

"real" should be --rear--.

Col. 3, line 11;

"Retorting" should be --Referring--.

Col. 3, line 19;

"to file" should be --to the--.

Col. 3, line 62;

After "50 and" delete --.--.

Col. 4, line 22;

"born 72" should be --bore 72--.

UNITED STATES PATENT AND TRADEMARK OFFICE
CERTIFICATE OF CORRECTION

PATENT NO. : 5,421,632
DATED : June 6, 1995
INVENTOR(S) : Mark Adomeit et al.

It is certified that error appears in the above-indentified patent and that said Letters Patent is hereby corrected as shown below:

Col. 6, line 44;

"or the" should be --of the--.

Col. 7, line 35;

"Tires," should be --Thus,--.

Signed and Sealed this

Thirty-first Day of October 1995

Attest:

BRUCE LEHMAN

*Attesting Officer*  *Commissioner of Patents and Trademarks*